(12) United States Patent
Rivadeneira et al.

(10) Patent No.: US 8,780,373 B2
(45) Date of Patent: Jul. 15, 2014

(54) SERIAL RASTER IMAGE PROCESSORS USED FOR ERROR CORRECTION IN A PARALLEL RASTER IMAGE PROCESSOR ENVIRONMENT

(75) Inventors: Randell Rivadeneira, Broomfield, CO (US); Arthur R. Roberts, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 13/159,028

(22) Filed: Jun. 13, 2011

(65) Prior Publication Data

US 2012/0314240 A1 Dec. 13, 2012

(51) Int. Cl.
*G06F 3/12* (2006.01)

(52) U.S. Cl.
USPC ........ 358/1.14; 358/1.13; 358/1.15; 358/1.17

(58) Field of Classification Search
None
See application file for complete search history.

(56) References Cited

U.S. PATENT DOCUMENTS

| | | | |
|---|---|---|---|
| 5,235,685 A * | 8/1993 | Caldara et al. | 710/313 |
| 6,532,016 B1 * | 3/2003 | Venkateswar et al. | 345/504 |
| 6,665,308 B1 * | 12/2003 | Rakib et al. | 370/441 |
| 6,879,409 B2 | 4/2005 | Motamed et al. | |
| 7,161,705 B2 | 1/2007 | Klassen | |
| 2002/0060801 A1 | 5/2002 | Motamed et al. | |
| 2003/0126406 A1 * | 7/2003 | Hammarlund et al. | 712/200 |
| 2004/0061892 A1 * | 4/2004 | Ferlitsch | 358/1.15 |
| 2004/0196496 A1 * | 10/2004 | Klassen | 358/1.15 |
| 2004/0196497 A1 * | 10/2004 | Klassen et al. | 358/1.15 |
| 2004/0196498 A1 * | 10/2004 | Klassen | 358/1.15 |
| 2004/0243934 A1 * | 12/2004 | Wood et al. | 715/517 |
| 2007/0057978 A1 * | 3/2007 | Hagiwara | 347/5 |
| 2007/0070375 A1 * | 3/2007 | Owen | 358/1.13 |
| 2007/0133028 A1 * | 6/2007 | Ford et al. | 358/1.13 |
| 2008/0137135 A1 * | 6/2008 | Takeishi | 358/1.15 |
| 2008/0184077 A1 * | 7/2008 | Kuttan et al. | 714/48 |
| 2009/0080025 A1 * | 3/2009 | Aronshtam et al. | 358/1.17 |
| 2009/0153892 A1 * | 6/2009 | Torii | 358/1.13 |
| 2010/0103444 A1 * | 4/2010 | Farrell et al. | 358/1.15 |
| 2010/0277757 A1 * | 11/2010 | Smith | 358/1.15 |
| 2011/0096346 A1 * | 4/2011 | Klassen | 358/1.13 |
| 2011/0122433 A1 * | 5/2011 | Klassen | 358/1.15 |
| 2011/0255124 A1 * | 10/2011 | Klassen | 358/1.15 |
| 2012/0023369 A1 * | 1/2012 | Bourbonnais et al. | 714/16 |

* cited by examiner

*Primary Examiner* — King Poon
*Assistant Examiner* — Ted Barnes
(74) *Attorney, Agent, or Firm* — Duft Bornsen & Fettig LLP

(57) ABSTRACT

Systems and methods are provided for error correction in a parallel RIP environment. The system is operable to receive a print job comprising logical pages, to separate the logical pages into segments, to distribute the segments to parallel RIPs for interpretation and rasterization, and to transmit the segments to a serial RIP for interpretation. The system is further operable to determine that a parallel RIP has encountered a dependency error that prevents the parallel RIP from rasterizing one of the segments, and to instruct the serial RIP to rasterize the one segment responsive to detecting the dependency error.

20 Claims, 4 Drawing Sheets

SERIAL RASTER IMAGE PROCESSORS USED FOR ERROR CORRECTION IN A PARALLEL RASTER IMAGE PROCESSOR ENVIRONMENT

FIELD OF THE INVENTION

The invention relates to the field of printing, and in particular, to print controllers capable of interpreting and rasterizing incoming print jobs.

BACKGROUND

In the field of printing, it is generally desirable to maximize not just printing quality, but also printing speed at a printer. Customers tend to dislike any delay that occurs between sending a print job to a printer, and receiving the printed sheets of the print job. Therefore, printer manufacturers strive to optimize not only the physical printing speed of marking engines that mark printed sheets, but also the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into segments of data (e.g., logical pages), and sends the segments to the parallel RIPs for interpretation and rasterization. For example, each of the parallel RIPs may interpret incoming segments by generating a display list or other instructions for marking pels on a page. The parallel RIPs may further rasterize/render the segment by placing pels in a bitmap with an appropriate mark/color based upon the generated display list.

Processing incoming print data using parallel RIPs is generally desirable because it increases the speed at which a print job may be interpreted and rasterized, which is often the most time consuming part of printing an incoming job. Unfortunately, when print jobs are encoded according to a page description language (e.g., PostScript), a segment may refer to a page element (e.g., pictures, headers, footers, etc.) that has been defined in another segment. For example, in a two-page job, the first logical page may define an image, and the second logical page may include a pointer to the image defined on the first page. Furthermore, each logical page may be sent to a different parallel RIP. In these cases, it is not possible to interpret or rasterize the second logical page without looking to the first logical page, which defines the page element. However, because the parallel RIP processing the second logical page has not interpreted the first logical page, it is incapable of interpreting the page element. Thus, the parallel RIP reports a processing error. This type of error is generally referred to as a dependency error.

In the present state of the art, a print controller detecting such an error from a parallel RIP aborts the print job, and indicates to the host that the print job contains an error. Thus, no printing of the print job occurs. This is generally undesirable to the end user, because the end user may not be capable of recreating a print job without the dependency error. Even assuming that the print job can be recreated without dependency errors and sent for printing a second time, regenerating the print job creates a significant and undesirable delay in the printing process.

SUMMARY

Embodiments described herein provide a serial RIP used in tandem with parallel RIPs of a print controller to fix dependency errors in print data. As segments of print data (e.g., logical pages) are distributed to the parallel RIPs, the serial RIP interprets incoming segments, but typically refrains from rasterizing them. Whenever a dependency error is encountered in a segment of print data being processed by a parallel RIP, the print controller directs the serial RIP to rasterize the segment having the error. Because the serial RIP has already interpreted the prior segments, it encounters no dependency error in interpreting the offending segment and rasterizing it. Additionally, because interpretation is generally faster than rasterization, the serial RIP may interpret print data at roughly the same speed that the parallel RIPs are interpreting and rasterizing the print data (i.e., the serial RIP "keeps up" with the parallel RIPs). Thus, the entire print job may be interpreted and rasterized at a speed associated with parallel raster image processing.

One embodiment is a print controller that processes print data for a print job. The print controller comprises at least two parallel Rasterization Image Processors (RIPs), a serial RIP, and a control unit. The control unit is operable to receive a print job comprising logical pages, to separate the logical pages into segments, to distribute the segments to the parallel RIPs for interpretation and rasterization, and to transmit the segments to the serial RIP for interpretation. The control unit is further operable to determine that a parallel RIP has encountered a dependency error that prevents the parallel RIP from rasterizing one of the segments, and to instruct the serial RIP to rasterize the one segment responsive to detecting the dependency error.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
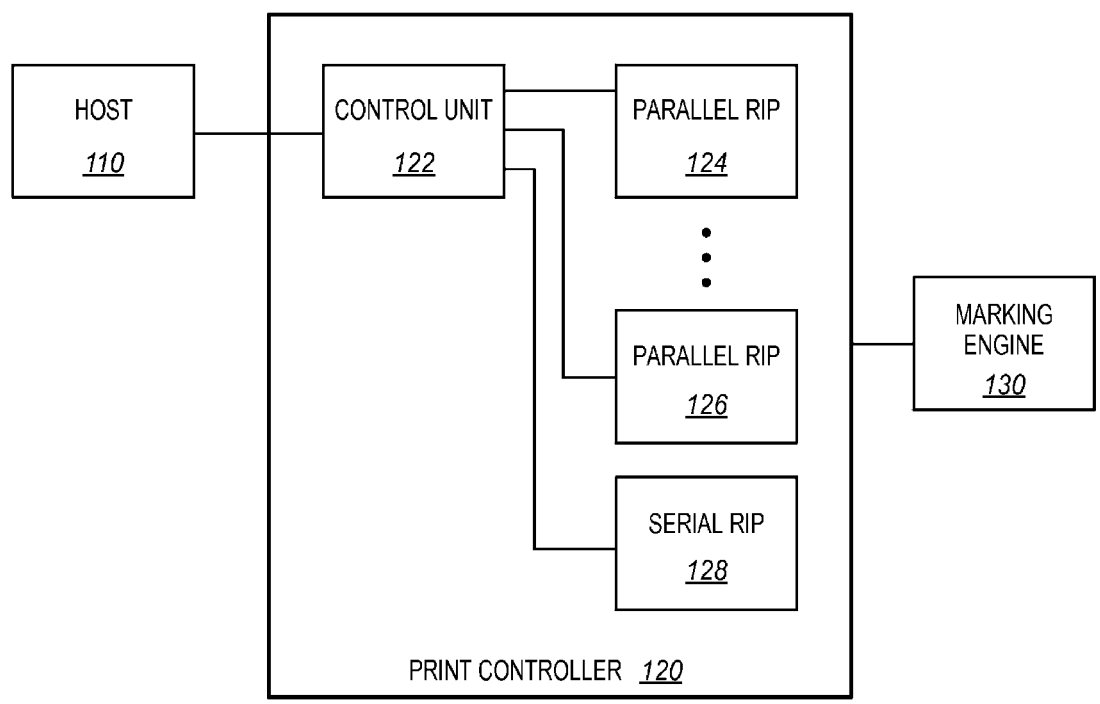
FIG. 1 is a block diagram of a print controller in an exemplary embodiment.

FIG. 1 is a block diagram of a print controller 120 in an exemplary embodiment. In FIG. 1, print controller 120 is coupled with host 110 and marking engine 130. Host 110 may comprise a computer, a print server, a software application, or any other functional component capable of submitting a print job, such as a print job encoded according to a page description language. Print controller 120 comprises any system, device, or component operable to interpret and rasterize incoming print data. Incoming print data may be encoded according to a page description language (e.g., PostScript, AFP, etc.). In this embodiment, print controller 120 comprises control unit 122, parallel RIPs 124-126, and serial RIP 128. Control unit 122 comprises any system, component, or device operable to direct Raster Image Processors (RIPs) in the interpretation and rasterization of print data from a print job. Parallel RIPs 124-126 may comprise any combination of multiple RIPs used for image processing. For example, parallel RIPs 124-126 may comprise two, three, or even more RIPs designed for parallel processing. Furthermore, each parallel RIP 124-126 may have the same processing speed as other RIPs, or may have a faster or slower processing speed than other RIPs of print controller 120. Parallel RIPs 124-126 may be implemented on single-core or multi-core processors. Serial RIP 128 may also comprise a Raster Image Processor used for image processing. Serial RIP 128 may have a different speed of processing than parallel RIPs 124-126. Additionally, serial RIP 128 may be implemented on single-core or multi-core processors.

Control unit 122 may be further operable to re-assemble rasterized print data from parallel RIPs 124-126 into an appropriate sequence for use by marking engine 130. In some embodiments, backend assembly of rasterized print data may be achieved by further devices, systems, or components of print controller 120. Print controller 120 may additionally comprise buffers, shared memory, print spools, and other functional components that assist a printer in processing and physically printing an incoming job.

Marking engine 130 may comprise any combination of printing machinery operable to mark an image onto a sheet. Marking engine 130 may use, for example, toner or ink to mark an image onto a sheet.

Print controller 120 provides an advantage over existing systems because it implements parallel RIP processing, yet it is also capable of recovering from dependency errors that exist within print data. Because serial RIP 128 has interpreted each segment of the print job, it is capable of interpreting and rasterizing segments that include images or other content defined in other segments.

Further details of the operation of print controller 120 will be discussed with regard to FIG. 2. Assume, for this embodiment, that print controller 120 receives incoming print jobs from host 110 for processing. Interpretation and rasterization of print data for the incoming jobs is desired before the print data is marked onto a sheetside by marking engine 130.

Figure 2:
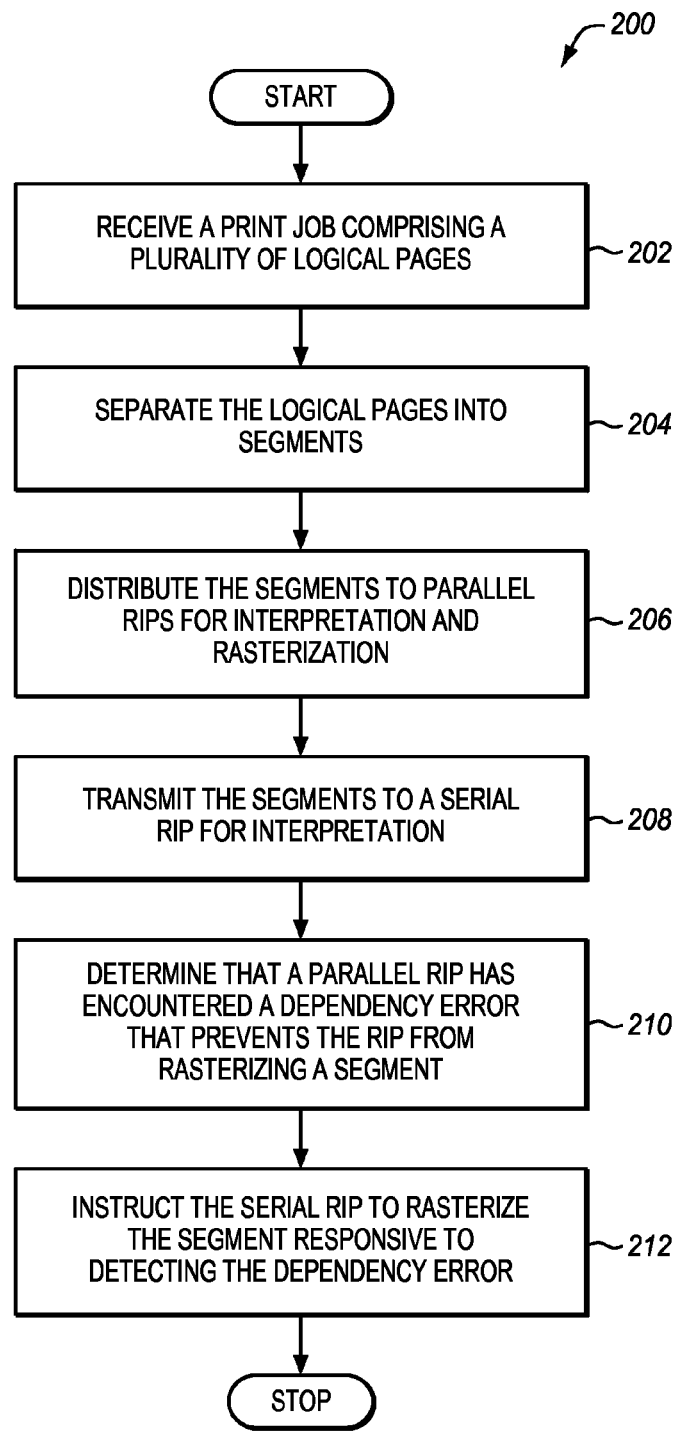
FIG. 2 is a flowchart illustrating a method of error correction for parallel RIP processing in an exemplary embodiment.

FIG. 2 is a flowchart illustrating a method 200 of error correction for parallel RIP processing an exemplary embodiment. The steps of method 200 are described with reference to print controller 120 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control unit 122 receives a print job comprising logical pages. A logical page may comprise the print data used to generate a rasterized image for a single page of print data, and may be encoded according to a page description language, such as PostScript. In certain circumstances (such as N-up printing), multiple logical pages may be combined onto a single sheetside when they are finally printed by marking engine 130. The logical pages received by control unit 122 may comprise an entire print job or some fraction thereof, and may also be accompanied by a job ticket describing additional processing parameters for the print job.

In step 204, control unit 122 separates the logical pages of the print job into segments. Typically, the segments will comprise individual logical pages segmented on a page-by-page basis, based upon page boundaries detected in the print data. However, any segmentation method may be used. For example, the print data may be separated into equally sized segments, the print data may be separated based upon comments in Document Structuring Conventions that segment the print data, or the print data may be separated based upon other criteria. Segmenting the logical pages into segments using methods other than a page-by-page basis has the potential to change the number of dependency errors encountered during processing.

In step 206, control unit 122 distributes the segments to parallel RIPs 124-126 for interpretation and rasterization/rendering. Segments may typically be distributed to parallel RIPs 124-126 in a round-robin order, although more complex techniques may be used for distribution of segments to each parallel RIP. Because each segment may take a longer or shorter amount of time to process depending upon the complexity of the print data for that segment, a parallel RIP may be capable of processing multiple "simple" segments while another parallel RIP of the same speed works on a single "complex" segment. Thus, in some embodiments, control unit 122 may maximize speed by distributing segments to parallel RIPs 124-126 as each parallel RIP becomes available. Control unit 122 may further be operable to track the progress of each segment so that rasterized print data may be properly re-assembled and sent to marking engine 130 in the appropriate order for processing.

In addition to distributing segments to parallel RIPs 124-126, control unit 122 also transmits the segments to serial RIP 128 for interpretation in step 208. The data segments may be transmitted all at once or may be transmitted across a series of requests. In one embodiment, serial RIP 128 interprets, but does not rasterize each segment of the print job. Instead, serial RIP 128 only rasterizes segments having dependency errors. Interpretation is distinguished from rasterization in that interpretation occurs when a RIP reads the print data and creates a display list or other series of commands for defining an output image. In contrast, rasterization (also known as "rendering" or "screening") is the task of taking an image described in, for example, a vector graphics format (e.g., a display list) and generating a raster image (e.g., pixels or dots placed at specific locations) for output on a printer. The rasterized image ("dots on a page") is used by a marking engine to print an image onto printed sheets for the print job. Interpretation is generally a much faster process than rasterization. For example, depending on the complexity of the print data in a segment, interpretation may be about three times as fast as rasterizing. Because of this, serial RIP 128 can keep up with multiple parallel RIPs 124-126 as they perform interpretation and rasterization for each segment.

In one embodiment, serial RIP 128 interprets each received segment after it has completed interpreting prior segments. In such an embodiment, control unit 122 may limit the speed at which segments are transmitted to serial RIP 128, such that a segment is not transmitted to serial RIP 128 for interpretation until one of parallel RIPs 124-126 reports successful interpretation or rasterization of that segment. In a further embodiment, serial RIP 128 awaits a command or request from control unit 122 that directs serial RIP 128 to begin interpretation of the next segment. Instructing serial RIP 128 to interpret print data substantially concurrently with parallel RIPs 124-126 may save processing time, as serial RIP 128 will not "backtrack" to earlier print data when an error is encountered.

During the above process, parallel RIPs 124-126 may report their status to control unit 122 in order to help control unit 122 track the overall progress of the print job as it is processed by print controller 120. For example, parallel RIPs 124-126 may be operable to report successful interpretation of a segment, and may be further operable to report errors encountered during interpretation of the segment. In some embodiments, parallel RIPs 124-126 may provide further details regarding the nature of the interpretation error (e.g., the details may explain whether the interpretation error is due to print data being corrupted, whether the interpretation error stems from a dependency issue, etc.). Furthermore parallel RIPs 124-126 may also be operable to report rasterization errors to control unit 122.

While in operation, control unit 122 directs parallel RIPs 124-126 as they process incoming segments of print data. This process may continue in a much similar fashion to well-known parallel RIP techniques. However, when a dependency error is encountered in print data, control unit 122 is operable to account for the error using the following technique, while still maintaining the speed of parallel RIP processing.

In step 210, control unit 122 determines that a parallel RIP has encountered a dependency error at a segment that prevents the RIP from rasterizing the segment. Typically, this error will be detected during interpretation of the segment, and will also prevent the parallel RIP from interpreting the segment. The dependency error may be reported by one of parallel RIPs 124-126, or control unit 122 may query parallel RIPs 124-126 and make a determination that a RIP that is non-responsive has encountered an error. Furthermore, control unit 122 may be able to determine that the error is a dependency error based upon information in the page description language for the segment that refers to a prior page or prior-defined page element or object. If the error relates to page dependency, control unit 122 may engage in the process described below.

In step 212, control unit 122 instructs serial RIP 128 to rasterize/render the segment having the dependency error. Because serial RIP 128 has been interpreting the print data at about the same time as the print data is passed to parallel RIPs 124-126, serial RIP 128 may rasterize the single segment having the error without significantly disrupting the speed of parallel processing. Furthermore, serial RIP 128 encounters no dependency error in the interpretation of the segment with the error, because serial RIP 128 has already interpreted the segments that the segment with the error depends upon. Thus, the speed of recovery for the error is much faster than merely using a single serial RIP to process the entire print job.

In one embodiment, it may be desirable for control unit 122 to continue transmission of other segments to other parallel RIPs (e.g., parallel RIPs that did not encounter a dependency error) while serial RIP 128 rasterizes the segment having the dependency error. This reduces any potential impact on processing speed for the print job by continuing parallel processing even after a dependency error has been detected in the print data. In a further embodiment, it may be desirable to halt transmission of segments to the parallel RIP that encountered the dependency error, at least until the segment with the error has been flushed from the parallel RIP and/or after serial RIP 128 has been instructed to rasterize the offending segment.

During processing of the print data, print controller 120 may further transmit the rasterized segments to marking engine 130 for printing. Before transmission, it may be desirable to assemble the rasterized segments into a logical order, so that the print data is not printed out of sequence. If rendered segments are not logical pages, they may be assembled into logical pages by control unit 122 or a backend assembler of print controller 120 before they are sent to marking engine 130. Additionally, if the print job includes instructions for N-up printing, it may be desirable to assemble the logical pages into the appropriate N-up configuration for the print job before sending the rasterized print data to marking engine 130 for printing.

Using method 200 described above, print controller 120 may beneficially engage in parallel RIP processing without being vulnerable to dependency errors in print data that would otherwise cause a failure in processing the print job. Thus, method 200 allows for speedy, reliable processing of print data in a print controller that accounts for dependency errors in print data.

Example

In the following example, additional processes, systems, and methods are described in the context of a serial RIP 128 operating at a print controller 120 to automatically recover the system from page dependency errors.

Figure 3:
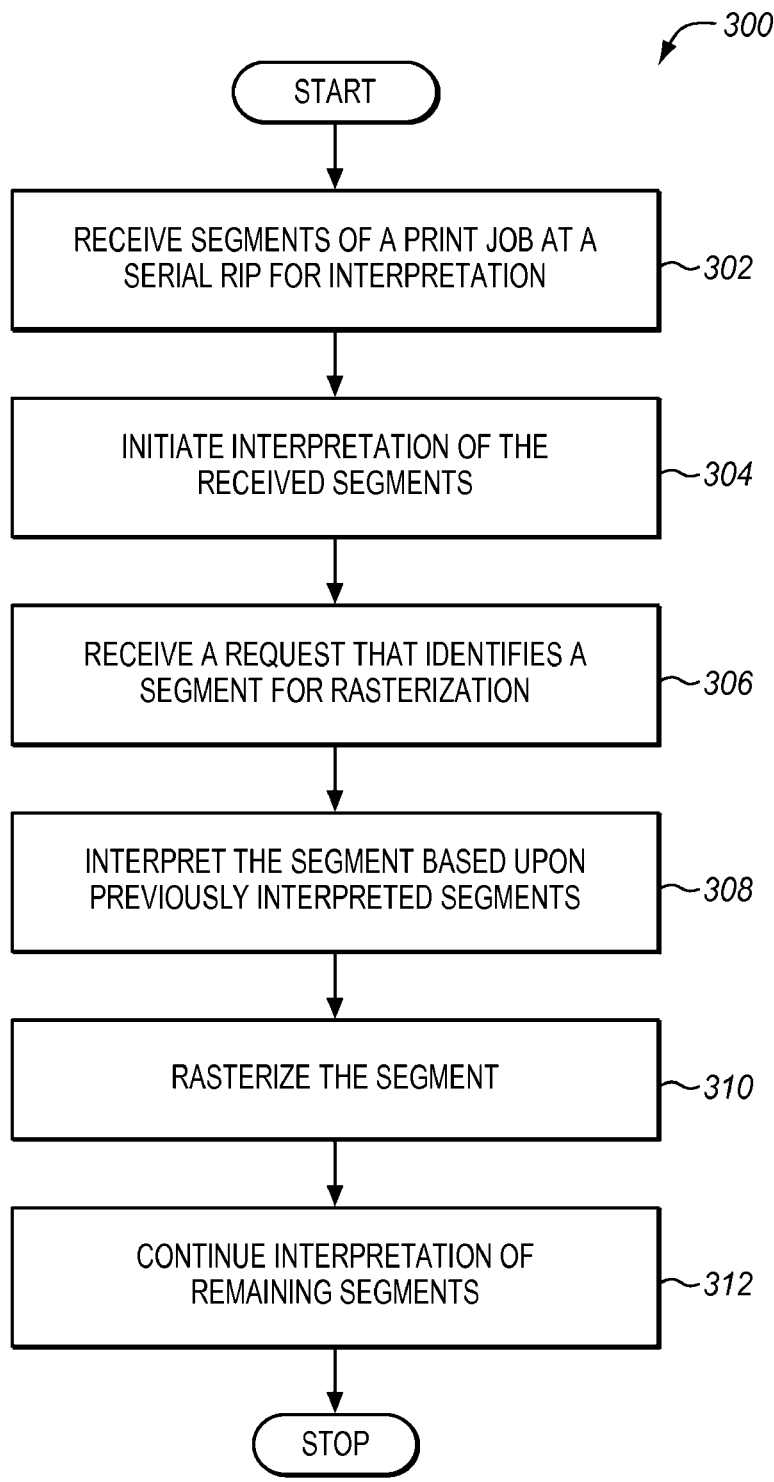
FIG. 3 is a flowchart illustrating a method of operating a serial RIP at a print controller in an exemplary embodiment.

FIG. 3 is a flowchart illustrating a method of operating a serial RIP 128 at a print controller 120 in an exemplary embodiment. Assume, for this example, that print controller 120 receives a print job comprising two logical pages. In this example, the first page includes a resource that defines an image to be printed, and the second page includes a pointer or other reference to the resource that defined the image in the first page. When print controller 120 receives the print job, it separates the print job into two segments—one for each logical page.

In step 302, serial RIP 128 receives both segments from control unit 122 for interpretation. In step 304, serial RIP 128 initiates interpretation of the received segments. This interpretation may be performed by serial RIP 128 utilizing a queue of display lists, wherein serial RIP 128 interprets the first logical page, and may continue with interpretation of the second page depending on the length of the queue for display lists. Thus, serial RIP 128 interprets the first, and then the second logical page of the print job.

Substantially concurrently with the process of interpretation happening at serial RIP 128, parallel RIP 124 processes the first segment, and parallel RIP 126 processes the second segment. Parallel RIP 124 properly generates a bitmap image of the first page for transmission to marking engine 130, but parallel RIP 126 reports an interpretation error because the second logical page merely points to, and does not define, the resource from the first logical page that defines the image. Thus, control unit 122 determines that error correction is desired.

In step 306, serial RIP 128 receives a request from control unit 122 that indicates the second segment should be rasterized. The request may comprise a number, a tag, or other metadata information that allows serial RIP 128 to locate the second segment among the print data.

In step 308, serial RIP 128 interprets the identified segment based upon previously interpreted segments. For example, serial RIP 128 may interpret the second segment by identifying the pointer that refers to the first logical page. Serial RIP 128 identifies the pointer as the source of the dependency error, and follows the pointer to access the resource stored in memory during the interpretation of the first segment. Serial RIP 128 then uses the definition from the first segment to generate a display list.

In step 310, serial RIP 128 rasterizes the segment. Rasterization/rendering will typically occur when serial RIP 128 uses a display list generated during interpretation in order to mark pels on a bitmap for processing by marking engine 130. In one embodiment, control unit 122 may refrain from instructing serial RIP 128 to rasterize segments that do not have dependency errors. In this manner, serial RIP 128 may continue to keep up with parallel RIPs 124-126 as they process print data, and control unit 122 may elect to instruct serial RIP 128 to only rasterize segments as required. Refraining from rasterizing each and every segment increases processing speed for serial RIP 128, because it allows parallel RIPs 124-126 to bear most of the processing load associated with rasterization.

In this example, no segments remain in the print job once the first two segments have been processed. However, one of ordinary skill in the art will appreciate that if other segments remained, serial RIP 128 could continue interpretation of remaining segments in step 312, in a fashion similar to step 304 described above.

Using method 300, serial RIP 128 may be used to interpret incoming print data that includes dependency errors. At the same time, serial RIP 128 may be used in a manner that does not interfere with existing parallel processing methods used to interpret the print job.

Figure 4:
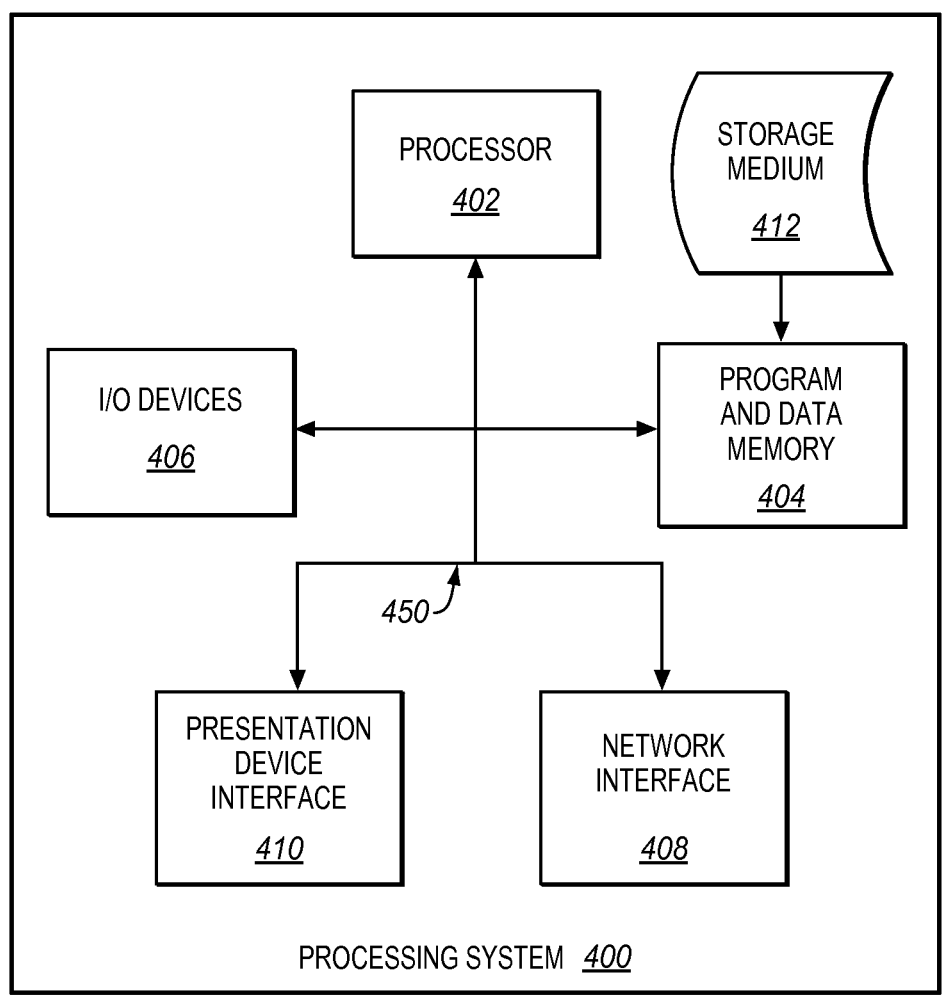
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print controller 120 to perform the various operations disclosed herein. FIG. 4 illustrates a processing system operable to execute a computer readable medium embodying programmed instructions to perform desired functions in an exemplary embodiment. Processing system 400 is operable to perform the above operations by executing programmed instructions tangibly embodied on a computer readable storage medium 412. In this regard, embodiments of the invention can take the form of a computer program accessible via the computer-readable medium 412 providing program code for use by a computer or any other instruction execution system. For the purposes of this description, a computer readable storage medium 412 can be anything that can contain or store the program for use by the computer.

The computer readable storage medium 412 can be an electronic, magnetic, optical, electromagnetic, infrared, or semiconductor device. Examples of the computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. A print controller, comprising:
   at least two parallel Rasterization Image Processors (RIPs);
   a serial RIP; and
   a control unit operable to receive a print job comprising a plurality of logical pages, to separate the logical pages into segments, to distribute the segments to the parallel RIPs for interpretation and rasterization, to transmit the segments to the serial RIP for interpretation, to determine that a parallel RIP has encountered a dependency error that prevents the parallel RIP from rasterizing one of the segments, and to instruct the serial RIP to rasterize the segment associated with the dependency error responsive to detecting the dependency error, while parallel RIPs continue processing segments of the print job which are not associated with the dependency error.

2. The print controller of claim 1, wherein:
   the control unit is further operable to instruct the serial RIP to rasterize segments only responsive to detecting dependency errors.

3. The print controller of claim 1, wherein:
   the control unit is further operable to halt distribution of segments to the parallel RIP that encountered the dependency error, to flush the segment associated with the dependency error from the parallel RIP, and to resume distribution of segments to the parallel RIP.

4. The print controller of claim 1, wherein:
   the control unit is further operable to instruct the serial RIP to interpret segments concurrently with the parallel RIPs.

5. The print controller of claim 1, wherein:
   the control unit is further operable to separate the logical pages into the segments by detecting page boundaries between individual logical pages and generating a segment for each individual logical page based on the page boundaries.

6. The print controller of claim 1, wherein:
   the serial RIP is further operable to interpret the segment associated with the dependency error by identifying a pointer in the segment that refers to a resource defined by another segment, to access a definition for the resource stored in memory, and to utilize the definition for the resource to generate a display list for the resource.

7. The system of claim 1, wherein:
   the control unit is further operable to determine that a parallel RIP has encountered a dependency error by:
   detecting that print data for a segment at the parallel RIP refers to another segment of print data that the parallel RIP does not have access to.

8. A method comprising:
   receiving a print job comprising a plurality of logical pages;

separating the logical pages into segments;
distributing the segments to at least two parallel Raster Image Processors (RIPs) for interpretation and rasterization;
transmitting the segments to a serial RIP for interpretation;
determining that a parallel RIP has encountered a dependency error that prevents the parallel RIP from rasterizing one of the segments; and
instructing the serial RIP to rasterize the segment associated with the dependency error responsive to detecting the dependency error, while parallel RIPs continue processing segments of the print job which are not associated with the dependency error.

9. The method of claim 8, further comprising:
instructing the serial RIP to rasterize segments only responsive to detecting dependency errors.

10. The method of claim 8, further comprising:
halting distribution of segments to the parallel RIP that encountered the dependency error;
flushing the segment associated with the dependency error from the parallel RIP; and
resuming distribution of segments to the parallel RIP responsive to instructing the serial RIP to rasterize the segment.

11. The method of claim 8, further comprising:
instructing the serial RIP to interpret segments concurrently with the parallel RIPs.

12. The method of claim 8, wherein:
separating the logical pages into segments comprises:
detecting page boundaries between individual logical pages; and
generating a segment for each individual logical page based up the page boundaries.

13. The method of claim 8, further comprising:
interpreting, with the serial RIP, the segment associated with the dependency error by identifying a pointer in the one segment that refers to a resource defined by another segment;
accessing, with the serial RIP, a definition for the resource stored in memory; and
utilizing, with the serial RIP, the definition for the resource to generate a display list for the resource.

14. The method of claim 8, wherein:
determining that a parallel RIP has encountered a dependency error comprises:
detecting that print data for a segment at the parallel RIP refers to another segment of print data that the parallel RIP does not have access to.

15. A non-transitory computer readable medium embodying programmed instructions which, when executed by a processor, are operable for performing a method comprising:
receiving a print job comprising a plurality of logical pages;
separating the logical pages into segments;
distributing the segments to at least two parallel Raster Image Processors (RIPs) for interpretation and rasterization;
transmitting the segments to a serial RIP for interpretation;
determining that a parallel RIP has encountered a dependency error that prevents the parallel RIP from rasterizing one of the segments; and
instructing the serial RIP to rasterize the segment associated with the dependency error responsive to detecting the dependency error, while parallel RIPs continue processing segments of the print job which are not associated with the dependency error.

16. The medium of claim 15, wherein the method further comprises:
instructing the serial RIP to rasterize segments only responsive to detecting dependency errors.

17. The medium of claim 15, wherein the method further comprises:
halting distribution of segments to the parallel RIP that encountered the dependency error;
flushing the segment associated with the dependency error from the parallel RIP; and
resuming distribution of segments to the parallel RIP responsive to instructing the serial RIP to rasterize the segment.

18. The medium of claim 15, wherein the method further comprises:
instructing the serial RIP to interpret segments concurrently with the parallel RIPs.

19. The medium of claim 15, wherein the method further comprises:
separating the logical pages into segments comprises:
detecting page boundaries between individual logical pages; and
generating a segment for each individual logical page based on the page boundaries.

20. The medium of claim 15, wherein the method further comprises:
interpreting, with the serial RIP, the segment associated with the dependency error by identifying a pointer in the segment that refers to a resource defined by another segment;
accessing, with the serial RIP, a definition for the resource stored in memory; and
utilizing, with the serial RIP, the definition for the resource to generate a display list for the image.

* * * * *